(12) United States Patent
Nishikawa (10) Patent No.: US 8,139,273 B2
(45) Date of Patent: Mar. 20, 2012

(54) PAPER-SHEET STAIN DETECTING APPARATUS AND METHOD

(75) Inventor: Masashi Nishikawa, Hyogo (JP)

(73) Assignee: Glory Ltd., Himeji-shi (JP)

( * ) Notice: Subject to any disclaimer, the term of this patent is extended or adjusted under 35 U.S.C. 154(b) by 380 days.

(21) Appl. No.: 12/417,175

(22) Filed: Apr. 2, 2009

(65) Prior Publication Data

US 2009/0252381 A1 Oct. 8, 2009

(30) Foreign Application Priority Data

Apr. 3, 2008 (JP) .................................. 2008-097201

(51) Int. Cl.
*H04N 1/04* (2006.01)

(52) U.S. Cl. ......... 358/474; 358/448; 358/463; 358/1.9; 382/100; 382/112; 382/191; 382/275

(58) Field of Classification Search .................. None
See application file for complete search history.

(56) References Cited

U.S. PATENT DOCUMENTS

| | | | | | |
|---|---|---|---|---|---|
| 4,589,144 | A | * | 5/1986 | Namba | 382/175 |
| 5,103,490 | A | * | 4/1992 | McMillin | 382/284 |
| 5,354,097 | A | * | 10/1994 | Tel | 283/72 |
| 5,477,244 | A | * | 12/1995 | Shibata et al. | 347/19 |
| 5,917,957 | A | * | 6/1999 | Ichikawa | 382/274 |
| 6,115,494 | A | * | 9/2000 | Sonoda et al. | 382/165 |
| 6,393,140 | B1 | * | 5/2002 | Itako | 382/135 |
| 7,676,058 | B2 | * | 3/2010 | Fan | 382/100 |
| 7,949,175 | B2 | * | 5/2011 | Fan | 382/135 |
| 2004/0131242 | A1 | * | 7/2004 | Klevtsov | 382/137 |
| 2006/0177093 | A1 | * | 8/2006 | Tsurumaki et al. | 382/100 |
| 2006/0251287 | A1 | * | 11/2006 | Tsurumaki et al. | 382/100 |
| 2007/0139720 | A1 | * | 6/2007 | Uno et al. | 358/296 |
| 2008/0174101 | A1 | * | 7/2008 | Fan | 283/70 |
| 2009/0263020 | A1 | * | 10/2009 | Hamasaki et al. | 382/181 |
| 2010/0034430 | A1 | * | 2/2010 | Natori | 382/112 |

FOREIGN PATENT DOCUMENTS

JP 63-182798 A 7/1988

\* cited by examiner

*Primary Examiner* — Mark K Zimmerman
*Assistant Examiner* — Dung Tran
(74) *Attorney, Agent, or Firm* — Foley & Lardner LLP

(57) ABSTRACT

In an apparatus for detecting a stain on a paper-sheet, a type and a transportation direction of the paper sheet are identified, and the information on whether each extraction target area of a read image corresponds to a white portion or a patterned portion of the paper sheet are stored. When the extraction target area corresponds to the white portion, a pixel having a lowest pixel value is extracted from a plurality of pixels constituting the extraction target area, and the read image is compressed into the pixel values of the extracted pixels as representative values, to generate a compressed image including a characteristic of a fine graffiti line drawn with a pencil or the like.

3 Claims, 7 Drawing Sheets

PAPER-SHEET STAIN DETECTING APPARATUS AND METHOD

This application claims priority from Japanese Patent Application 2008-097201, filed Apr. 3, 2008, which is incorporated herein by reference in its entirety.

BACKGROUND OF THE INVENTION

1. Field of the Invention

The present invention relates to an apparatus and method for detecting stain on a paper sheet, in which a paper sheet which is being transported is irradiated with light from a light source, and reflected light or transmitted light thereof is received by a light receiving sensor, to determine a stain on the paper-like sheet based on an output signal for each pixel of the light receiving sensor.

2. Description of the Related Art

Conventionally, it has been required that, at the time of checking the fitness of printed matter of paper sheets such as bills, securities, and tickets, if graffiti such as a character, sign, or mark is on the paper sheet, the paper sheet is handled as an unfit paper and the paper sheet is not re-circulated in the market.

As a device that detects stains on the paper sheet, for example, a paper-sheet stain determining apparatus that detects a stain by converting reflected light or transmitted light from a sheet to an electric signal, binarizing the electric signal, adding the binarized signals (the number of pixels), and comparing the added signals with a reference value is disclosed in Japanese Patent Application Laid-open No. S63-182798.

In Japanese Patent Application Laid-open No. S63-182798, however, to detect a fine graffiti line drawn on a paper sheet with a pencil or the like as a stain, high-resolution image data having a large data size is required. Therefore, a large capacity memory for storing such image data is necessary and consequently its circuit size becomes larger. As a result, the cost of the paper-sheet stain determining apparatus increases. For example, to detect a fine graffiti line of 0.5 mm width, high-resolution image data of 100 dpi (dots per inch)×100 dpi (size of one pixel is 0.25 mm×0.25 mm) is required.

In this connection, an operation needs to be performed using image data having a large data size. Therefore, there is another problem that the processing time at the time of performing such an operation by a central processing unit (CPU) becomes greater. If a CPU having high processing speed is used, although the processing time becomes short, the cost of the CPU becomes more expensive and the circuit size becomes much larger. As a result, the cost of the paper-sheet stain determining apparatus increases as well as using the memory described above.

Therefore, it is an important issue to realize stain detection without enlarging the circuit size, when a fine graffiti line drawn with a pencil or the like is to be detected.

SUMMARY OF THE INVENTION

It is an object of the present invention to at least partially solve the problems in the conventional technology.

An apparatus for detecting a stain on a paper sheet according to an aspect of the invention includes an irradiating unit irradiates a paper sheet being transported with light; an image obtaining unit that receives reflected light or transmitted light from the paper sheet by a light receiving sensor included therein, and obtains a read image from an output signal per pixel of the light receiving sensor; an identification unit that identifies a type and a transportation direction of the paper sheet; an area information storage unit that stores therein information on whether each extraction target area of the read image corresponds to a white portion or a patterned portion of the paper sheet; an image compressing unit that extracts a pixel having a lowest pixel value from a plurality of pixels constituting an extraction target area when the extraction target area in the read image of the paper sheet whose type and transportation direction are identified by the identification unit corresponds to the white portion, and compresses the read image into pixel values of the lowest extracted pixels as representative values, from the extraction target areas; and a stein determining unit that determines a stain on the paper sheet using the compressed image compressed by the image compressing unit.

An apparatus for detecting a stain on a paper sheet according to another aspect of the invention includes an irradiating unit irradiates a paper sheet being transported with light; an image obtaining unit that receives reflected light or transmitted light from the paper sheet by a light receiving sensor included therein, and obtains a read image from an output signal per pixel of the light receiving sensor; an identification unit that identifies a type and a transportation direction of the paper sheet; an area information storage unit that stores therein information on whether each extraction target area of the read image corresponds to a white portion or a patterned portion of the paper sheet; an image compressing unit that extracts a brightest pixel from a plurality of pixels constituting an extraction target area when the extraction target area in the read image of the paper sheet whose type and transportation direction are identified by the identification unit corresponds to the patterned portion, and compresses the read image into pixel values of the brightest pixels as representative values, from the extraction target areas; and a stein determining unit that determines a stain on the paper sheet using the compressed image compressed by the image compressing unit.

A method for detecting a stain on a paper sheet according to still another aspect of the invention includes the steps of: irradiating a paper sheet being transported with light; receiving reflected light or transmitted light from the paper sheet by a light receiving sensor to obtain a read image from an output signal per pixel of the light receiving sensor; identifying a type and a transportation direction of the paper sheet; setting, in an area storage unit, information on whether each extraction target area of the read image corresponds to a white portion or a patterned portion of the paper sheet; extracting a pixel having a lowest pixel value from a plurality of pixels constituting an extraction target area when the extraction target area in the read image of the paper sheet whose type and the transportation direction are identified in the identifying corresponds to the white portion, while extracting a brightest pixel from a plurality of pixels constituting an extraction target area when the extraction target area in the read image corresponds to the patterned portion, to compress the read image into pixel values of the extracted pixels as representative values, from the respective extraction target areas, corresponding to the white portion and the patterned portion; and determining a stain on the paper sheet using the compressed image compressed in the compressing.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an apparatus and method for detecting a stain of a paper sheet according to the present invention will be explained below in detail with reference to the accompanying drawings. The following embodiments are explained with a case that the paper sheet is a bill.

An outline and features of an apparatus for detecting a stain on a paper-sheet according to a first embodiment of the present invention are explained first, and a configuration and a processing flow of the apparatus for detecting a stain are sequentially explained.

The outline and characteristics of the apparatus for detecting a stain on a paper sheet according to the first embodiment are explained. An apparatus 10 for detecting a stain on a paper sheet irradiates a paper sheet being transported with light from a light source, and receives reflected light or transmitted light thereof by a light receiving sensor, to determine a stain on the paper sheet by an output signal of the light receiving sensor for each pixel. For example, a thick graffiti line drawn with a felt-tipped marker as well as a fine graffiti line drawn with a pencil are both designated as detection targets, assuming a watermark portion or a portion having a light-colored base design as a detection area.

Thus, to detect a fine graffiti line, high-resolution image data is required. However, if the image data is held as it is, as explained in the conventional art, the circuit size of the apparatus 10 for detecting a stain becomes larger.

Therefore, it can be considered to compress a read image, as being performed in denominating bills. However, if pixel values of a plurality of pixels to be compressed are averaged to determine a representative value, at the time of thinning out a plurality of pixels into one pixel, a fine line having a characteristic only in a few pixels such as one or two pixels will lose its characteristic.

Therefore, in the apparatus 10 for detecting a stain according to the first embodiment, a pixel having the lowest value is extracted from a plurality of pixels in each extraction target area at the time of image compression, and the read image is compressed into pixel values of the lowest extracted pixels as representative values, from the extraction target areas.

That is, in the apparatus 10 for detecting a stain, it is focused on a fact that graffiti or the like drawn in the watermark portion or the portion having a light-colored base design of the bills are obtained as black areas (small values) in the high-resolution image data (read data), the lowest values of the pixels in the respective extraction target areas are used as the representative values to compress the read image, thereby enabling to compress the read image without losing the characteristic of the fine line.

Figure 1:
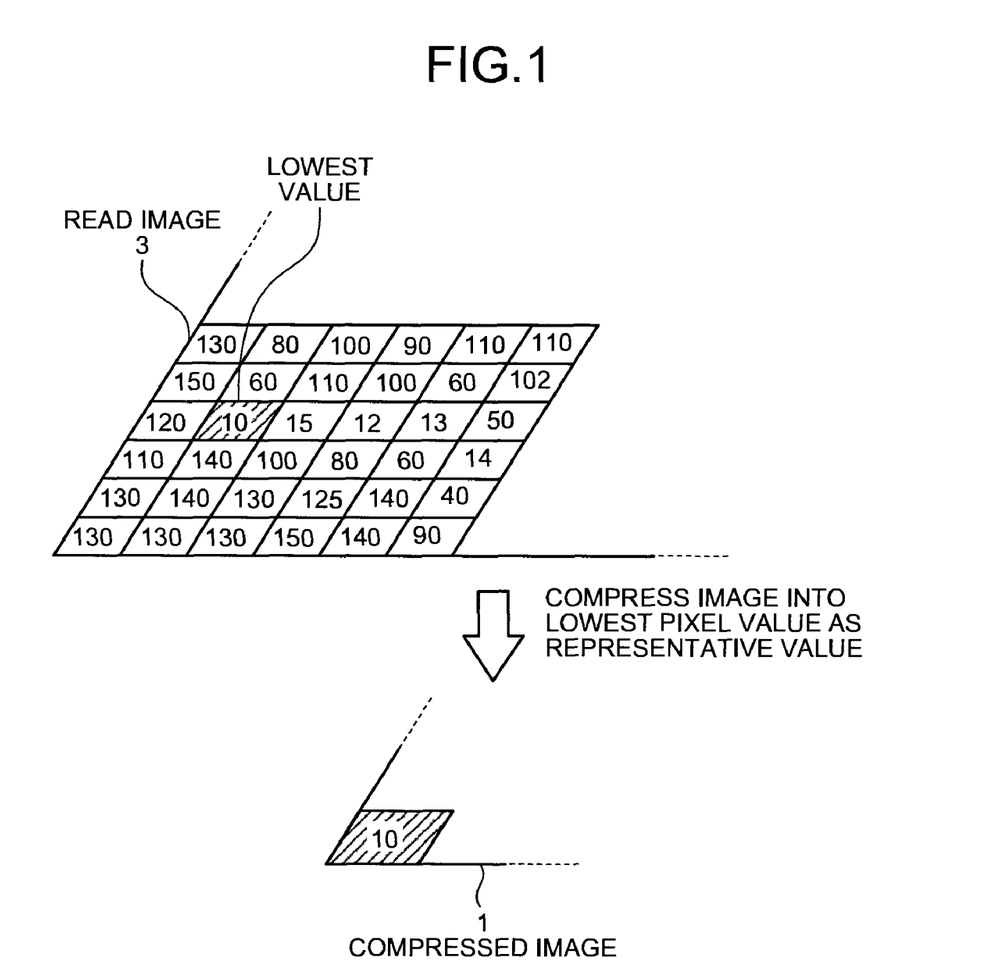
FIG. 1 is a conceptual diagram for explaining characteristics of an apparatus for detecting a stain on a paper sheet according to a first embodiment of the present invention.

In an example shown in FIG. 1, a case that 6 vertical pixels by 6 horizontal pixels are compressed into 1 pixel in a read image 3 is shown. In this example, because pixel value "10" is the lowest value, the lowest value is extracted as the representative value, and a compressed image 1 is generated using lowest values consisted of lowest values extracted from other extraction areas with the same manner.

For example, when it is assumed that resolution of the read image 3 is 100 dpi×100 dpi (the size of 1 pixel is 0.25 mm×0.25 mm), if a line sensor having 768 pixels in the line scan direction is used, the total number of pixels is 442368 in an area having 576 lines. However, if 6 vertical pixels by 6 horizontal pixels are compressed into 1 pixel, data for 442368 pixels can be compressed into 1/36, that is, 12288 pixels with the characteristic of the fine line being maintained. A compressibility of the read image 3 can be arbitrarily set according to how much length of graffiti it is desired to detect. In this example, even if the read image 3 is compressed, a fine line of 0.5 millimeter can be completely detected based on the original resolution.

Thus, in the first embodiment, the compressed image 1 including the characteristic of the fine graffiti line drawn with the pencil or the like can be obtained, and a capacity to be stored in an image memory can be considerably decreased by obtaining the compressed image 1, and further, an amount of calculation at the time of stain determination of the bill can be also decreased. As a result, the fine graffiti line can be detected at a high speed using the compressed image stored in the image memory having a less memory capacity.

Accordingly, in the first embodiment, stain detection for a fine graffiti line (black graffiti) with respect to the watermark portion or the portion having a light-colored base design of the bill can be realized without enlarging the circuit size (the size of a circuit board), thereby enabling to realize cost reduction of the apparatus.

Figure 2:
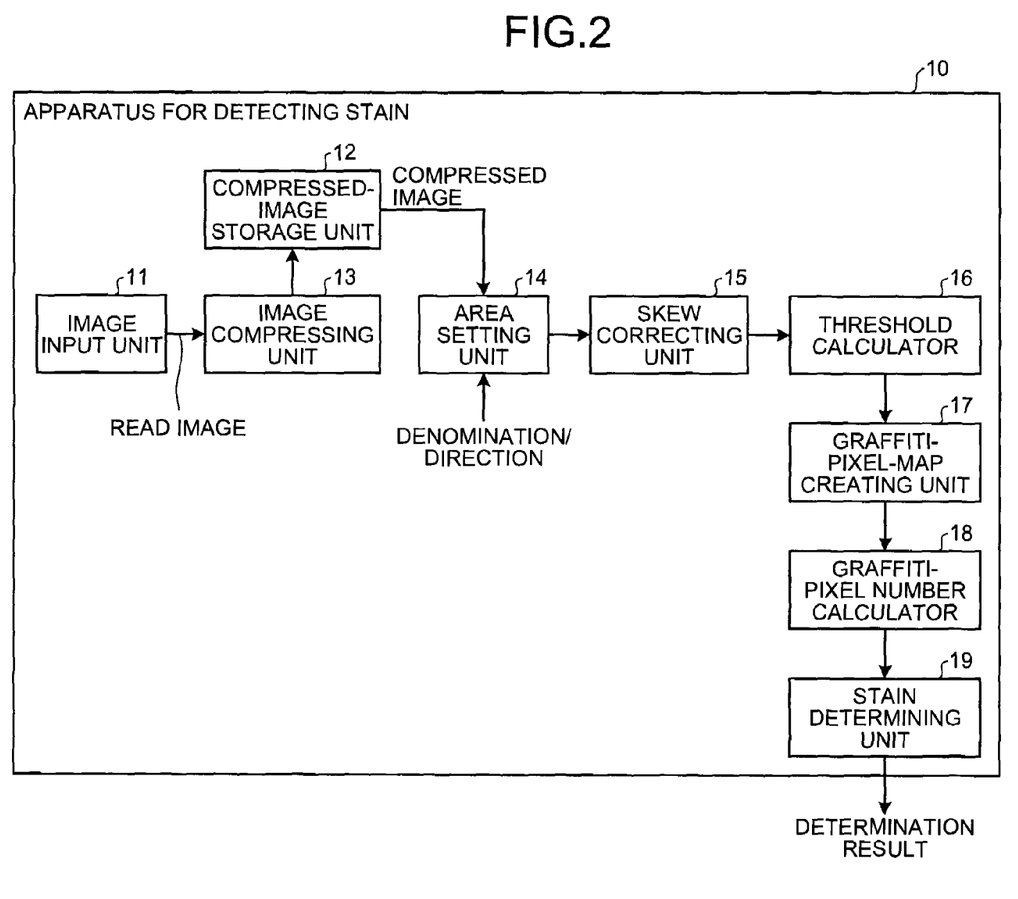
FIG. 2 is a functional block diagram of a configuration of the apparatus for detecting a stain on a paper sheet according to the first embodiment.

A configuration of the apparatus for detecting a stain according to the first embodiment is explained next. FIG. 2 is a functional block diagram depicting the configuration of the apparatus for detecting a stain according to the first embodiment. As shown in FIG. 2, the apparatus 10 for detecting a stain includes an image input unit 11, a compressed-image storage unit 12, an image compressing unit 13, an area setting unit 14, a skew correcting unit 15, a threshold calculator 16, a graffiti-pixel-map creating unit 17, a graffiti-pixel number calculator 18, and a stain determining unit 19.

The image input unit 11 includes a light source including an LED array and a line sensor that receives reflected light or transmitted light from the paper sheet. The line sensor is an imaging device such as a charge coupled device (CCD) or a complementary metal oxide semiconductor (CMOS) that reads brightness data per pixel by imaging the paper sheet being transported. In the first embodiment, it is assumed that the line sensor can image the bill by irradiating the bill with infrared rays so that the part of the bill having a light-colored base design can be excluded from the read image.

The compressed-image storage unit 12 is an image memory that stores therein the compressed image 1 of the bill compressed by the image compressing unit 13. It is assumed here that an image of 1.5 mm×1.5 mm, which is a compressed image of the bill obtained by reflection of the infrared rays, is stored per pixel.

The image compressing unit 13 compresses the read image 3 of the bill read by the image input unit 11. Specifically, the image compressing unit 13 extracts the pixel having the lowest value from the pixels in each extraction target area at the time of compressing the image and compresses the read image into pixel values of the lowest extracted pixels as the representative values, from the extracted target areas For example, as shown in FIG. 1, when 6 vertical pixels by 6 horizontal pixels in the read image 3 are compressed into 1 pixel, because pixel value "10" is the lowest value in a block in FIG. 1, the image compressing unit 13 extracts the lowest value as the representative value, generates the compressed image 1 using lowest values consisted of lowest values extracted from other extraction areas, and stores the generated compressed image 1 in the compressed-image storage unit 12.

Thus, the compressed image 1 including the characteristic of the fine graffiti line drawn with the pencil or the like can be stored in the compressed-image storage unit 12, while reducing the storage capacity of the compressed-image storage unit 12 according to a preset compressibility.

The area setting unit 14 sets a target area to be determined, for which stain determination of the bill is executed. Specifically, for example, because a denomination identification unit (not shown) identifies an imaging direction of the bill at the time of identifying the denomination of the same bill, the area setting unit 14 confirms the denomination and the direction corresponding to the compressed image 1 of the bill read from the compressed-image storage unit 12 based on information from the denomination identification unit, determines a base point of the compressed image 1 based on the denomination of the compressed image 1 and the imaging direction thereof, and sets the watermark portion or the portion having a light-colored base design of the bill of the denomination as a target area to be determined based on the base point.

The skew correcting unit 15 corrects a shift when the compressed image of the bill read by the image input unit 11 is skewed. Specifically, the skew correcting unit 15 calculates a shift amount indicating how much a central coordinate of the compressed image diverges in a line direction at the time of starting the stain determination, and calculates a correction amount of the target area to be determined based on the shift amount to correct the target area to be determined. Further, because the denomination and direction of the bill have been specified, and the target area to be determined and presence of the base design are also specified based on the denomination and direction, an identification unit can specify beforehand whether the target area to be determined is an area for detecting black graffiti or white graffiti.

The threshold calculator 16 calculates a threshold such as a reference threshold and a detection threshold. Specifically, the threshold calculator 16 averages the pixel values of the pixels, which are equal to or larger than a lower limit of reference threshold calculation, in the target areas to be determined of the compressed image 1, to calculate a mean value thereof as the reference threshold, and multiplies the reference threshold by a predetermined detection coefficient, thereby calculating the detection threshold. The detection threshold is a set value (0<N<1) arbitrarily set from a host apparatus. As a smaller value is set, finer graffiti can be detected. On the other hand, when a large value is set, detection focusing on large graffiti can be performed, while ignoring the fine graffiti.

Figure 3:
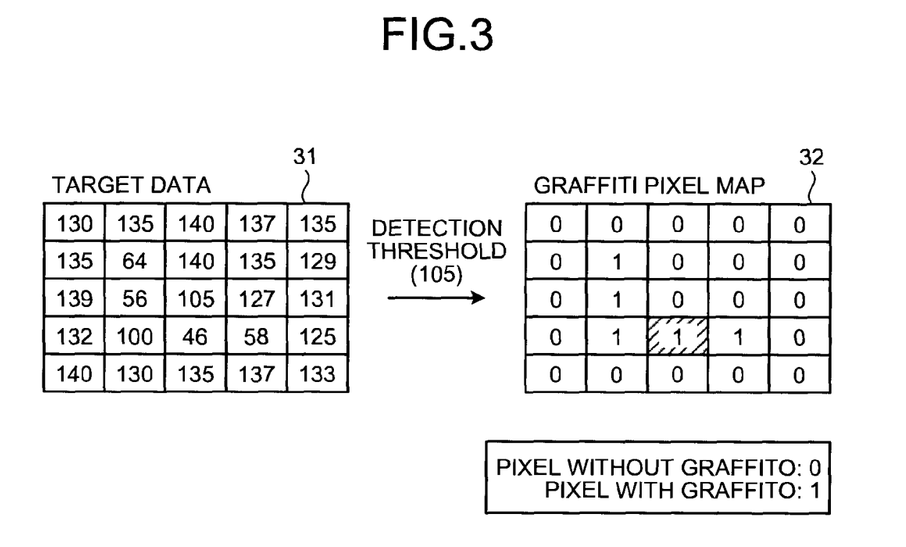
FIG. 3 is a schematic diagram for explaining a creation outline of a graffiti map in the first embodiment.

The graffiti-pixel-map creating unit 17 uses the detection threshold calculated by the threshold calculator 16 to create a graffiti pixel map of the respective target areas to be determined of the compressed image 1. For example, as shown in FIG. 3, when the detection threshold is set as 105, the graffiti-pixel-map creating unit 17 maps "1" or "0" to the respective pixels of target data 31, designating a pixel having the pixel value less than 105 of the target data 31 of the target area to be determined as pixel "1" having a graffito, and other pixels (pixels having the pixel value equal to or larger than 105) as pixel "0" having no graffito, to binarize the pixel value in the target area to be determined, thereby creating a graffiti pixel map 32.

The graffiti-pixel number calculator 18 calculates the number of graffiti pixels from the graffiti pixel map created by the graffiti-pixel-map creating unit 17. Specifically, the graffiti-pixel number calculator 18 calculates the number of graffiti pixels "1", while performing elimination of noise and connection of missing parts by adapting a filter to be applied to peripheral pixels of a target pixel to the graffiti map.

Figure 4:
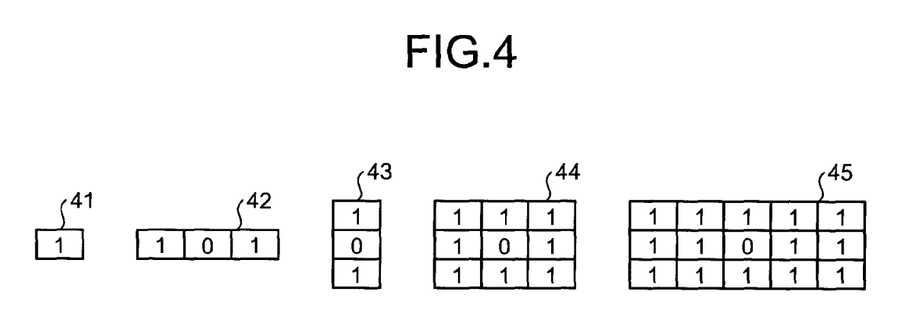
FIG. 4 is an example of a filter applied to a graffiti-pixel map.
Figure 5:
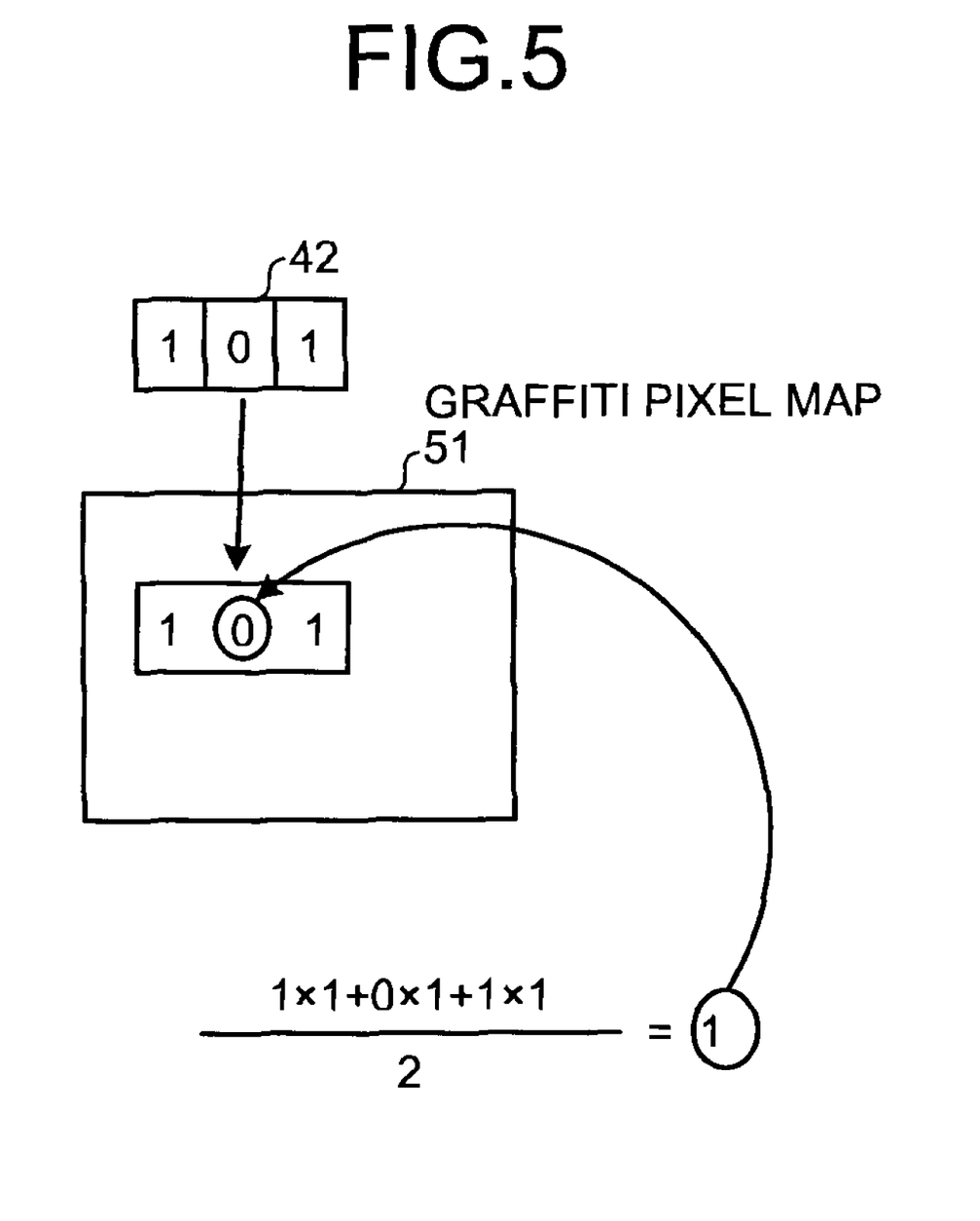
FIG. 5 is a schematic diagram for explaining an application example of the filter.

For example, as shown in FIG. 4, the graffiti-pixel number calculator 18 includes filters 41 to 45 applied to the peripheral pixels of the target pixel, and adapts a preset filter of these filters to the graffiti map. In an example of FIG. 5, an example in which the filter 42 including "1 0 1" toward the line direction is adapted to a graffiti pixel map 51 is shown. It is defined here that "1" is an effective pixel and "0" is a pixel to be ignored. When the filter 42 fits in the peripheral pixels of the graffiti pixel map 51, division is performed by using the number of "1" in the filter such that (1×1+0×1+1×1)/2, and the result comes to "1". Therefore, the target pixel is finally interpolated as a graffiti pixel and added up to the number of graffiti pixels. When the calculation result at the time of applying the filter includes a small number, for example, when a fractional part of the calculation result is omitted, then the result is 0, it is determined that there is no graffito.

The stain determining unit 19 determines whether there is graffiti in the target area to be determined of the compressed image 1. Specifically, the stain determining unit 19 determines whether the number of graffiti pixels calculated by the graffiti-pixel number calculator 18 is equal to or larger than a predetermined threshold. As a result, when the number of graffiti pixels is equal to or larger than the predetermined threshold, the stain determining unit 19 sets a no-good (NG) flag to the target area to be determined. On the other hand, when the number of graffiti pixels is less than the predetermined threshold, the stain determining unit 19 then determines whether there is a graffito in other target areas to be determined. After determination whether there is a graffito in all target areas to be determined, if at least one NG flag is set in any one of the target areas to be determined, the stain determining unit 19 determines that the bill of the compressed image 1 is an unfit bill, and if the NG flag is not set in any target area to be determined, the stain determining unit 19 determines that the bill is a fit bill. The threshold is a numerical value that can be set by the host apparatus, and as the numerical value is decreased, a finer graffiti can be detected.

Figure 6:
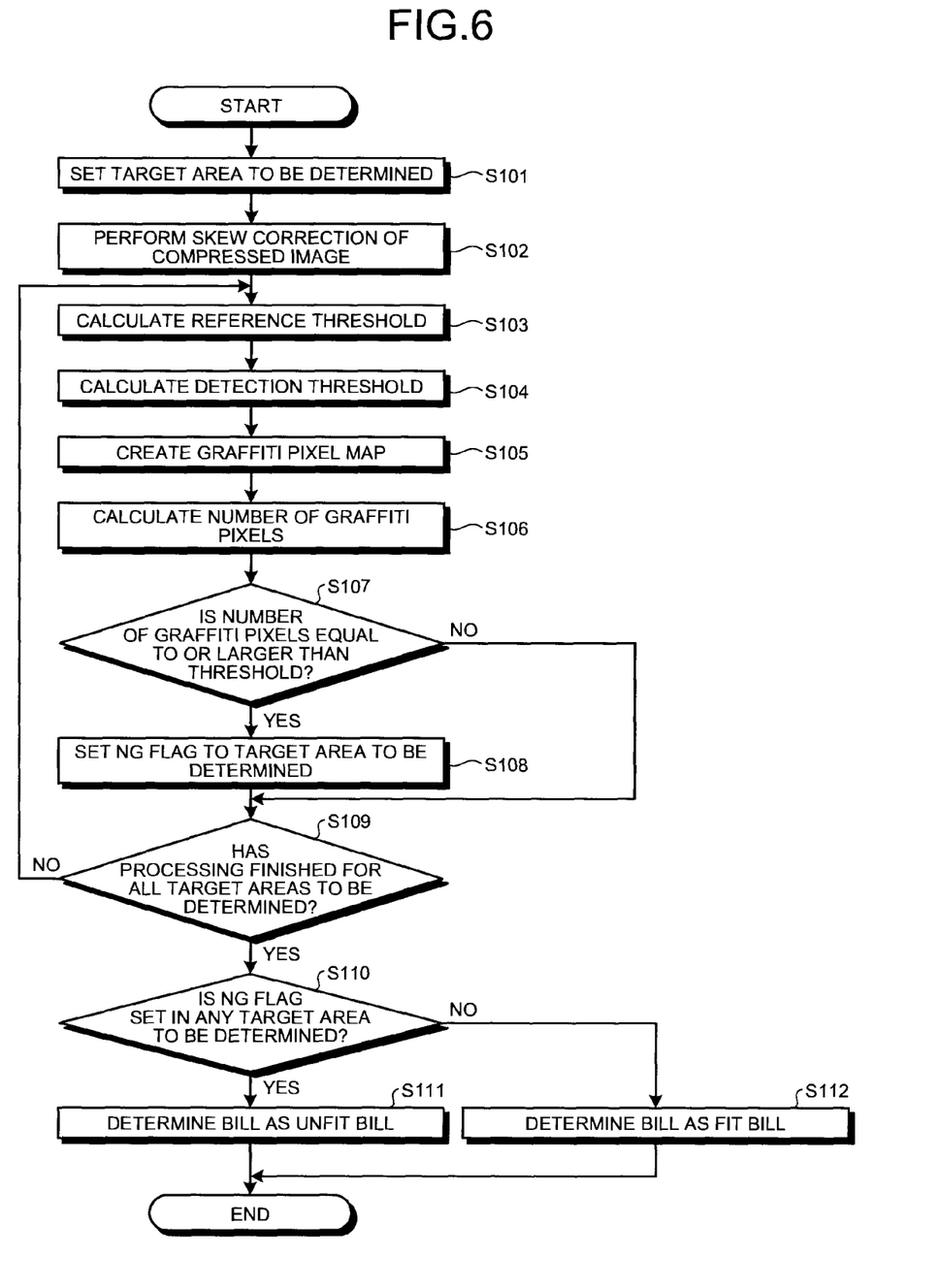
FIG. 6 is a flowchart of a stain-determining process procedure of the paper sheet according to the first embodiment.

A stain determining process of the paper sheet according to the first embodiment is explained next. FIG. 6 shows a flowchart of a stain-determining process procedure of the paper sheet according to the first embodiment. The stain determining process is performed when the compressed image 1 is stored in the compressed-image storage unit 12 by the image compressing unit 13.

As shown in FIG. 6, the area setting unit 14 sets the target area to be determined in the compressed image 1 of the bill read from the compressed-image storage unit 12 based on the denomination and the imaging direction of the bill obtained from the denomination identification unit (not shown) (Step S101).

Subsequently, the skew correcting unit 15 calculates the shift amount indicating how much the center coordinate of the compressed image read by the area setting unit 14 shifts in the line direction, and calculates the correction amount of the target area to be determined from the shift amount, thereby correcting the target area to be determined (Step S102).

The threshold calculator 16 averages the pixel values of the pixels, which are equal to or larger than the lower limit of the reference threshold calculation, to calculate a mean value thereof as the reference threshold (Step S103), and multiplies the reference threshold by the predetermined detection coefficient, thereby calculating the detection threshold (Step S104), for one of the target areas to be determined of the compressed image, which has been subjected to skew correction by the skew correcting unit 15.

The graffiti-pixel-map creating unit 17 maps "1" or "0" to the respective pixels, designating a pixel having a pixel value less than the detection threshold calculated by the threshold calculator 16 as pixel "1" having a graffito, and a pixel having a pixel value equal to or larger than the detection threshold as pixel "0" having no graffito, to binarize the pixel value in the target area to be determined, thereby creating the graffiti pixel map 32 (Step S105).

Subsequently, the graffiti-pixel number calculator 18 calculates the number of graffiti pixels "1", while performing elimination of noise and connection of missing parts by adapting a filter to the graffiti pixel map created by the graffiti-pixel-map creating unit 17 (Step S106).

The stain determining unit 19 determines whether the number of graffiti pixels calculated by the graffiti-pixel number calculator 18 is equal to or larger than the predetermined threshold (Step S107). As a result, when the number of graffiti pixels is equal to or larger than the predetermined threshold (Yes at Step S107), the stain determining unit 19 sets the NG flag to the target area to be determined (Step S108). When the number of graffiti pixels is less than the predetermined threshold (No at Step S107), at Step S109, presence of a stain in other target areas to be determined is determined or stain determination of the bill is performed.

Thereafter, until the presence of a stain is determined for all the target areas to be determined set by the area setting unit 14 (No at Step S109), the threshold calculator 16, the graffiti-pixel-map creating unit 17, the graffiti-pixel number calculator 18, and the stain determining unit 19 repeatedly perform the process from Step S103 to Step S108.

When determination of the presence of a graffito in all the target areas to be determined finishes (Yes at Step S109), the stain determining unit 19 determines whether the NG flag is set in any target area to be determined in the compressed image 1 (Step S110).

At this time, if at least one NG flag is set in any target area to be determined (Yes at Step S110), the stain determining unit 19 determines that the bill of the compressed image 1 is an unfit bill (Step S111). When the NG flag is not set in any target area to be determined (No at Step S110), the stain determining unit 19 determines that the bill of the compressed image 1 is a fit bill (Step S112), and finishes the process.

In the first embodiment, the apparatus 10 for detecting a stain is configured such that a pixel having the lowest value is extracted from the pixels in each extraction target area at the time of image compression, and a read image is compressed into the pixel values of the lowest extracted pixels as the representative values, from the extraction target areas. Therefore, stain detection of a fine graffiti line (black graffiti) with respect to the watermark portion or the portion having a light-colored base design of the bill can be realized without enlarging the circuit size (the size of a circuit board), and the cost of the apparatus can be reduced.

More specifically, the compressed image 1 including the characteristic of the fine graffiti line drawn with the pencil or the like can be obtained, and a capacity to be stored in an image memory can be considerably decreased by obtaining the compressed image 1, and further, an amount of calculation at the time of stain determination of the bill can be also decreased. As a result, the fine graffiti line can be detected at a high speed by using the compressed image stored in the image memory having a less memory capacity.

In the first embodiment, even if the information of the bill is decreased with compression of the read image 3, stain determination of a bill is performed using the compressed image 1 including the characteristic of the fine graffiti line drawn with the pencil or the like. Therefore, determination of the presence of a stain in the respective target areas to be determined or stain determination of the bill can be performed accurately.

Figure 7:
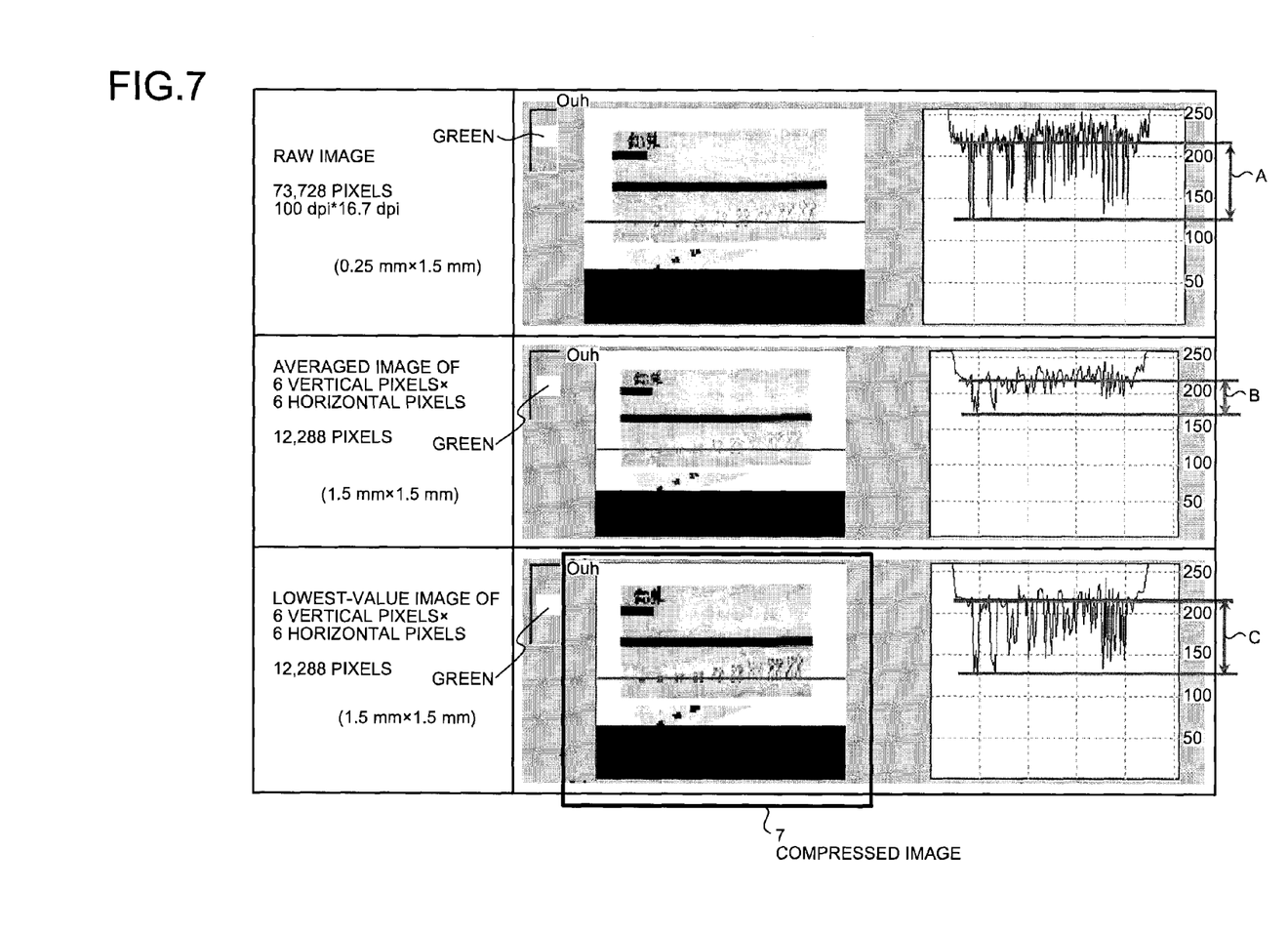
FIG. 7 is a schematic diagram for explaining superiority of a compressed image obtained on the paper sheet according to the first embodiment.

This is explained specifically with reference to FIG. 7. The upper graph in FIG. 7 depicts distribution of pixel values of the read image (raw image) itself read by the line sensor or the like, the middle graph in FIG. 7 depicts distribution of pixel values of a 36-pixel averaged image when 6 vertical pixels×6 horizontal pixels of the read image are averaged and compressed, and the lower graph in FIG. 7 depicts distribution of pixel values of a 36-pixel lowest-value image when the read image is compressed using the lowest value of 6 vertical pixels×6 horizontal pixels as the representative value. Each image includes graffiti with a pencil in the target area to be determined.

The comparison of three graphs indicates that in the read image, the pixel value of the graffiti portion (portion A) drawn with the pencil is lower than the portion with no graffito (base design of the bill) and can be captured clearly as black. On the other hand, in the averaged image of 6 vertical pixels×6 horizontal pixels, there is little difference between the pixel values of the graffiti portion (portion B) drawn with the pencil and the pixel values of the portion with no graffito, and it is hard to detect distinction between the base design portion and the graffiti portion. In the lowest-value image of 6 vertical pixels×6 horizontal pixels, a difference in the pixel values between the graffiti portion (portion C) drawn with the pencil and the portion with no graffito can be captured, as in the read image (raw image).

Thus, the lowest-value image of 6 vertical pixels×6 horizontal pixels obtained in the first embodiment can capture the difference in the pixel values between the graffiti portion drawn with the pencil and the portion with no graffito roughly equivalently to the read image (raw image), different from the averaged image of 6 vertical pixels×6 horizontal pixels. Therefore, the presence of a stain in the respective target areas to be determined and the stain of the bill can be accurately determined.

In the first embodiment, an example in which the stain determination is performed with respect to the watermark portion or the portion having a light-colored base design of the bill is explained. However, the stain determination can be similarly performed for a portion having a dark base design of the bill. In a second embodiment of the present invention, an example in which the read image 3 is compressed while maintaining the characteristic of the white graffito with respect to the portion having a dark base design of the bill is explained.

That is, in the second embodiment, it is focused on a fact that white graffiti or the like drawn in the portion having a dark base design of the bills are obtained as white areas (large values) in the high-resolution image data (read data), the highest values of the pixels in the respective extraction target areas are used as the representative values to compress the read image. Therefore, the compression of the read image 3 without losing the characteristic of the white graffito is enabled.

Figure 8:
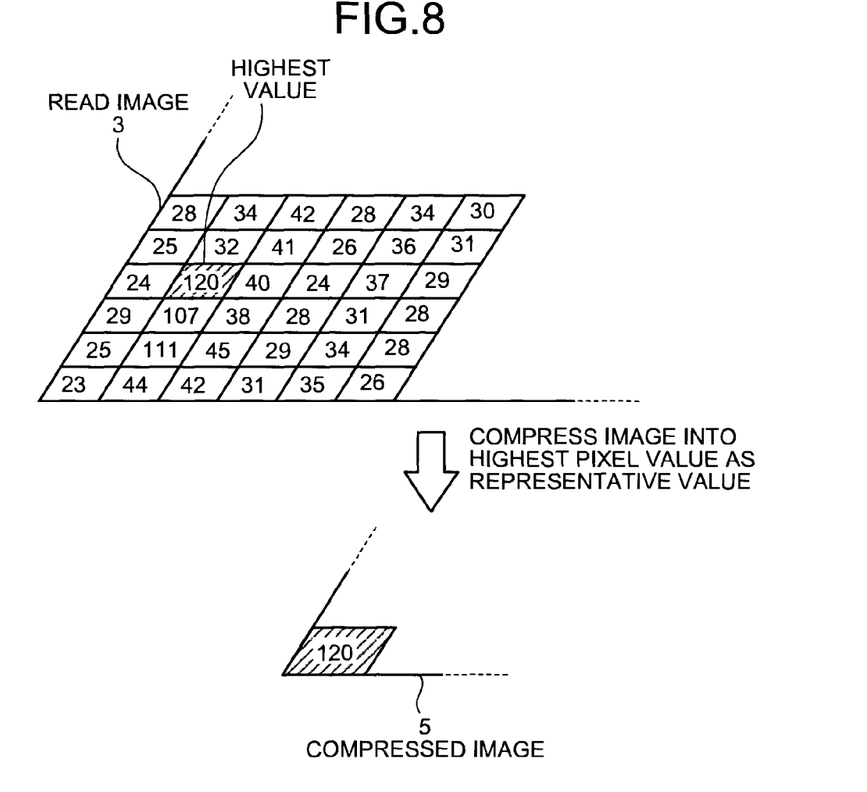
FIG. 8 is a conceptual diagram for explaining characteristics of an apparatus for detecting a stain on a paper-sheet according to a second embodiment of the present invention.

In an example shown in FIG. 8, a case that 6 vertical pixels×6 horizontal pixels are compressed into 1 pixel in the read image 3 is shown. In this example, because pixel value "120" is the highest value, the highest value is extracted as the representative value, and a compressed image 5 is generated using highest values consisted of the highest values extracted from other extraction areas in the same manner.

For example, when it is assumed that resolution of the read image 3 is 100 dpi×100 dpi (the size of 1 pixel is 0.25 mm×0.25 mm), if a line sensor having 768 pixels in the line scan direction is used, the total number of pixels is 442368 in an area having 576 lines. However, if 6 vertical pixels by 6 horizontal pixels are compressed into 1 pixel, data for 442368 pixels can be compressed into ⅟₃₆, that is, 12288 pixels with the characteristic of the white graffito being maintained.

Thus, in the second embodiment, the compressed image 5 including the characteristic of the white graffiti drawn with a correction pen, a color pencil, or the like can be obtained, and a memory capacity used as the image memory can be considerably decreased by obtaining the compressed image 5 as in the first embodiment, and further, the amount of calculation at the time of stain determination of the bill can be also decreased. As a result, the white graffiti can be detected at a high speed using the compressed image stored in the image memory having a less memory capacity.

To determine the presence of a stain in the respective target areas to be determined and the stain of the bill using the compressed image 5 for detecting the white graffiti obtained in this manner, a process different from that in the first embodiment is performed in respective functional units shown in FIG. 2. While different points from the first embodiment are explained below, explanations of the units that perform the same processing (the skew correcting unit 15, the graffiti-pixel number calculator 18, and the stain determining unit 19) will be omitted.

The area setting unit 14 first sets a target area to be determined in the compressed image 5 of the bill read from the compressed-image storage unit 12 based on the denomination and imaging direction of the bill obtained from the denomination determining unit (not shown), and at this time, sets the portion having a dark base design of the bill as the target area to be determined.

The threshold calculator 16 calculates thresholds such as a reference threshold and a detection threshold as in the first embodiment. However, in the second embodiment, the threshold calculator 16 calculates the reference threshold and the detection threshold for detecting the white graffiti. Specifically, the threshold calculator 16 averages the pixel values of the pixels, which are equal to or larger than the lower limit of reference threshold calculation, in the target areas to be determined of the compressed image 5, to calculate a mean value thereof as the reference threshold, and multiplies the reference threshold by a number obtained by subtracting a predetermined value set by the upper unit from the largest pixel value "255", thereby calculating a detection threshold "reference threshold×(255−predetermined value)".

Figure 9:
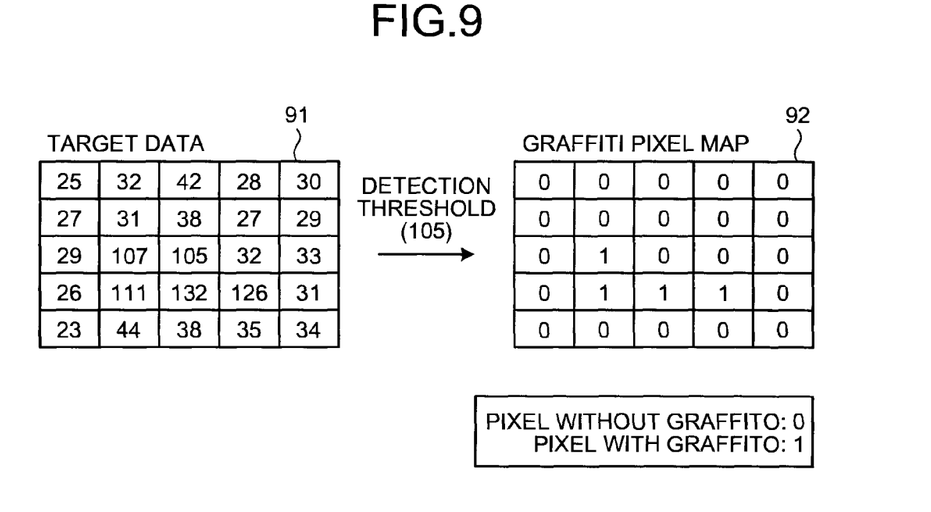
FIG. 9 is a schematic diagram for explaining an art of creating a graffiti map in the second embodiment.

The graffiti-pixel-map creating unit 17 uses the detection threshold calculated by the threshold calculator 16 to create the graffiti pixel map of the respective target areas to be determined of the compressed image 5, as described in the first embodiment. However, in the second embodiment, because the white graffito is to be detected, a difference point is that the graffiti-pixel-map creating unit 17 maps "1" or "0", designating a pixel having the pixel value exceeding the detection threshold as a graffiti pixel, and a pixel having a pixel value equal to or less than the detection threshold as a pixel having no graffito. For example, as shown in FIG. 9, when the detection threshold is set as 105, the graffiti-pixel-map creating unit 17 maps "1" or "0" to the respective pixels of target data 91, designating a pixel having the pixel value larger than 105 of the target data 91 of the target area to be determined as pixel "1" having a graffito, and other pixels (having the pixel value equal to or less than 105) as pixel "0" having no graffito, to binarize the pixel values in the target areas to be determined, thereby creating a graffiti pixel map 92.

Thus, the graffiti-pixel-map creating unit 17 can calculate the number of graffiti pixels "1" while performing elimination of noise and connection of missing parts by adapting a filter to the graffiti pixel map created by the graffiti-pixel-map creating unit 17 and determine the presence of a stain in the respective target areas to be determined and the stain of the bill using the calculated number of graffiti pixels, as in the first embodiment.

As described above, in the second embodiment, because the apparatus 10 for detecting a stain is configured such that the pixel having the highest value is extracted from the pixels in each extraction target area at the time of image compression, and the read image is compressed into the pixel values of the extracted pixel as the representative values, from the extraction target areas. Therefore, stain detection (of white graffiti) with respect to the portion having a dark base design of the bill can be realized without enlarging the circuit size (the size of a circuit board), and the cost of the apparatus can be reduced.

Further in the second embodiment, even if the information of the bill decreases with compression of the read image 3, stain determination of the bill is performed using compressed image 5 including the characteristic of the white graffiti drawn with the correction pen, the color pencil, or the like. Therefore, determination of the presence of a stain in the respective target areas to be determined and stain determination of the bill can be performed accurately.

While exemplary embodiments of the present invention have been explained above, the invention may be carried out in various different modes other than the above embodiments. Another embodiment included in the present invention is explained as a third embodiment of the invention.

For example, in the first embodiment, the image compression and stain determination by which the fine graffiti line (black graffiti) can be detected with respect to the watermark portion or the portion having a light-colored base design have been explained. On the other hand, in the second embodiment, the image compression and stain determination by which the white graffiti can be detected with respect to the portion having a dark base design of the bill have been explained. However, the contents of the first and second embodiments can be appropriately combined and carried out.

That is, the watermark portion or the portion having a light-colored base design of the bill is stored as first area information per denomination of the bill, and the portion having a dark base design of the bill is stored as second area information. A pixel having the lowest value is extracted at the time of extracting the representative pixel in a first area, whereas a pixel having the highest value is extracted at the time of extracting the representative pixel in a second area, thereby compressing the read image 3 using the pixel value of the extracted pixel as the representative value.

That is, even in the same one read image 3, the pixel having the lowest value is extracted with respect to the watermark portion or the portion having the light-colored base design of a bill, and the pixel having the highest value is extracted with respect to the portion having the dark base design of the bill, thereby enabling to obtain a compressed image 7 in which the characteristic of the black graffiti drawn with the pencil or the like and the characteristic of the white graffiti drawn with the correction pen, the color pencil, or the like are maintained. However, only the read image obtained by the reflected light from the paper sheet can be used for detection of the white graffiti.

For the first area of the compressed image 7 obtained in this manner, as shown in FIG. 7, the number of graffiti pixels is calculated, designating a pixel having a pixel value equal to or less than the detection threshold as the graffiti pixel, to determine the presence of a stain in the target area to be determined and perform stain determination of the bill (the first embodiment). For the second area of the compressed image 7, the number of graffiti pixels is calculated, designating a pixel having a pixel value exceeding the detection threshold as the graffiti pixel, to determine the presence of a stain in the target area to be determined and perform stain determination of the bill (the second embodiment). Accordingly, both of the black graffiti and the white graffiti can be detected with respect to one face of the paper sheet, thereby enabling to realize more multilateral graffiti detection.

In the first and second embodiments, an example in which the present invention is applied to bills has been explained. However, the target of the stain determination is not necessarily bills, and can be securities or tickets, and the present invention can be applied to general paper sheets including the securities and tickets.

According to the present invention, the type and transportation direction of the paper sheet are identified, and the information as to whether each extraction target area corresponds to a white portion or a patterned portion are stored. When the extraction target area corresponds to the white portion, a pixel having a lowest pixel value is extracted from a plurality of pixels constituting the extraction target area, and the read image is compressed into pixel values of the lowest extracted pixels as representative values, from the extraction target areas. Therefore, stain detection of a fine graffiti line (black graffiti) can be realized without enlarging the circuit size (the size of a circuit board), and the cost of the apparatus can be reduced.

According to the present invention, the type and transportation direction of the paper sheet are identified, and the information as to whether each extraction target area corresponds to a white portion or a patterned portion are stored. When the extraction target area corresponds to the patterned portion, a brightest pixel is extracted from a plurality of pixels constituting the extraction target area, and the read image is compressed into pixel values of the brightest pixels as representative values, from the extraction areas. Therefore, stain detection of a fine graffiti line (white graffiti) can be realized without enlarging the circuit size (the size of a circuit board), and the cost of the apparatus can be reduced.

According to the present invention, the type and transportation direction of the paper sheet are identified, and the information as to whether each extraction target area corresponds to a white portion or a patterned portion are set. When the extraction target area corresponds to the white portion, a pixel having a lowest pixel value is extracted from a plurality of pixels constituting the extraction target area, and when the extraction target area in the read image corresponds to the patterned portion, a brightest pixel is extracted from a plurality of pixels constituting the extraction target area. The read image is compressed into pixel values of the extracted pixels as representative values, from the respective extraction target areas, corresponding to the white portion and the pattered portion. Therefore, stain detection of fine graffiti lines of black and white graffiti can be realized without enlarging the circuit size (the size of a circuit board), and the cost of the apparatus can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. Apparatus for detecting a stain on a paper-sheet comprising:
   an irradiating unit that irradiates a paper sheet being transported with light;
   an image obtaining unit that:
      receives reflected light or transmitted light from the paper sheet by a light receiving sensor included in the image obtaining unit, and
      obtains a read image from an output signal for each of a plurality of pixels of the light receiving sensor;
   an identification unit that identifies a type and a transportation direction of the paper sheet;
   an area information storage unit that stores therein information on whether each of a plurality of extraction target areas of the read image corresponds to a white portion or a patterned portion of the paper sheet;
   an image compressing unit that:
      extracts a pixel having a lowest pixel value from a plurality of pixels constituting an extraction target area when the extraction target area in the read image of the paper sheet, whose type and transportation direction are identified by the identification unit, corresponds to the white portion, and
      compresses the read image into pixel values of the lowest extracted pixels as representative values, from the extraction target areas; and
   a stain determining unit that determines a stain on the paper sheet using the compressed image compressed by the image compressing unit.

2. An apparatus for detecting a stain on a paper-sheet comprising:
   an irradiating unit that irradiates a paper sheet being transported with light;
   an image obtaining unit that:
      receives reflected light or transmitted light from the paper sheet by a light receiving sensor included in the image obtaining unit, and
      obtains a read image from an output signal for each of a plurality of pixels of the light receiving sensor;
   an identification unit that identifies a type and a transportation direction of the paper sheet;
   an area information storage unit that stores therein information on whether each of a plurality of extraction target areas of the read image corresponds to a white portion or a patterned portion of the paper sheet;

an image compressing unit that:
  extracts a brightest pixel from a plurality of pixels constituting an extraction target area when the extraction target area in the read image of the paper sheet, whose type and transportation direction are identified by the identification unit, corresponds to the patterned portion, and
  compresses the read image into pixel values of the brightest pixels as representative values, from the extraction target areas; and
a stain determining unit that determines a stain on the paper sheet using the compressed image compressed by the image compressing unit.

3. A method for detecting a stain on a paper-sheet comprising:
  irradiating a paper sheet being transported with light, and receiving reflected light or transmitted light from the paper sheet by a light receiving sensor to obtain a read image from an output signal for each of a plurality of pixels of the light receiving sensor;
  identifying a type and a transportation direction of the paper sheet;
  storing, in an area information storage unit, information on whether each of a plurality of extraction target areas of the read image corresponds to a white portion or a patterned portion of the paper sheet;
  extracting a pixel having a lowest pixel value from a plurality of pixels constituting an extraction target area when the extraction target area in the read image of the paper sheet whose type and the transportation direction are identified in the identifying, corresponds to the white portion, while extracting a brightest pixel from a plurality of pixels constituting an extraction target area when the extraction target area in the read image corresponds to the patterned portion;
  compressing the read image into pixel values of the extracted pixels as representative values, from the respective extraction target areas, corresponding to the white portion and the patterned portion; and
  determining a stain on the paper sheet using the compressed image compressed in the compressing.

* * * * *